(12) United States Patent
Iwasaki

(10) Patent No.: US 7,650,068 B2
(45) Date of Patent: Jan. 19, 2010

(54) CAMERA AND METHOD OF IMAGING

(75) Inventor: Hiroyuki Iwasaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 212 days.

(21) Appl. No.: 11/656,983

(22) Filed: Jan. 24, 2007

(65) Prior Publication Data
US 2007/0189758 A1 Aug. 16, 2007

(30) Foreign Application Priority Data
Feb. 14, 2006 (JP) ............................. 2006-036243

(51) Int. Cl.
G03B 7/08 (2006.01)
H04N 5/235 (2006.01)

(52) U.S. Cl. ..................... 396/234; 396/121; 348/229.1

(58) Field of Classification Search ................. 396/234, 396/213, 233, 89, 121–123; 348/229.1, 230.1, 348/254, 256, 362–366
See application file for complete search history.

(56) References Cited

U.S. PATENT DOCUMENTS
2004/0207736 A1* 10/2004 Muramatsu ................. 348/254
2005/0195291 A1 9/2005 Kubo

FOREIGN PATENT DOCUMENTS

| JP | A 4-257831 | 9/1992 |
|----|------------|--------|
| JP | A 4-310930 | 11/1992 |
| JP | A 8-063597 | 3/1996 |
| JP | A 2001-016573 | 1/2001 |
| JP | A-2001-054014 | 2/2001 |
| JP | A 2001-078067 | 3/2001 |
| JP | A-2005-252711 | 9/2005 |

* cited by examiner

Primary Examiner—Rochelle-Ann J Blackman
(74) Attorney, Agent, or Firm—Oliff & Berridge, PLC

(57) ABSTRACT

A camera includes a photometry section, an exposure calculating section, and a correction calculating section. The photometry section obtains photometry values at a plurality of positions of a subject. The exposure calculating section obtains an exposure value when photographing based on the photometry values. The correction calculating section obtains a correction value for correction of the exposure value based on a highest value among photometry values belonging to a predetermined range out of the plurality of photometry values obtained by the photometry section.

21 Claims, 9 Drawing Sheets

CAMERA AND METHOD OF IMAGING

CROSS REFERENCE TO RELATED APPLICATION

This application is based upon and claims the benefit of priority from Japanese Patent Application No. 2006-036243, filed on Feb. 14, 2006, the entire contents of which are incorporated herein by reference.

BACKGROUND OF THE INVENTION

1. Field of the Invention

The present invention relates to a camera for photographing a subject image and a method of imaging related to the camera.

2. Description of the Related Art

Conventionally, there are publicly known electronic cameras, which have a photographing mode capable of photographing with a wider dynamic range than in a regular photographing mode for the purpose of appropriately photographing a scene having a large difference in luminance in a photographic screen (refer to Japanese Unexamined Patent Application Publication No. 2001-78067).

However, with such a conventional electronic camera, when imaging with a wide dynamic range, the user needs to perform a switching operation to a predetermined photographing mode. Therefore, there is a possibility to miss a photo opportunity by performing such operation. Further, a relatively inexperienced user may not be able to determine whether to widen the dynamic range or not and may hence photograph a scene having a large difference in luminance with a narrow dynamic range, and then an image output of a high-luminance part saturates to be a photographing failure with high possibility. In this aspect, such conventional electronic cameras have a room for improvement.

SUMMARY OF THE INVENTION

The present invention is for solving the above-described problems. An object of the present invention is to provide a camera and a method of imaging capable of appropriately photographing a scene having a large difference in luminance.

Hereinafter, the present invention will be explained.

A camera according to a first aspect of the present invention includes a photometry section, an exposure calculating section, and a correction calculating section. The photometry section obtains photometry values at a plurality of positions of a subject. The exposure calculating section obtains an exposure value when photographing based on the photometry values. The correction calculating section obtains a correction value for correction of the exposure value based on a highest value among photometry values belonging to a predetermined range out of the plurality of photometry values obtained by the photometry section.

In the above-described camera of the first aspect, it is preferable that the highest value is a highest value among photometry values equal to or smaller than a predetermined value out of the plurality of photometry values.

In the above-described camera of the first aspect, it is preferable that the correction value is a value for correction of the exposure value to an under side.

In the above-described camera of the first aspect, it is preferable that the correction calculating section obtains the correction value based on a difference between the exposure value obtained in the exposure calculating section and the highest value. Further, it is more preferable that the correction calculating section obtains a correction value for correction of the exposure value to a more under side as the difference is larger.

In the above-described camera of the first aspect, it is preferable that the exposure calculating section detects a facial part of a person as the subject, and obtains the exposure value based on a photometry value corresponding to the facial part out of the plurality of photometry values obtained in the photometry section.

A camera according to a second aspect of the present invention includes a photometry section, an exposure calculating section, a correction calculating section, an imaging section, and a control section. The photometry section obtains photometry values at a plurality of positions of a subject. The exposure calculating section obtains an exposure value when photographing based on the photometry values. The correction calculating section obtains a correction value for correction of the exposure value based on a second highest photometry value excluding a highest value out of the plurality of photometry values obtained by the photometry section. The imaging section images an image of the subject. The control section controls an exposure when photographing in the imaging section based on the correction value and the exposure value.

It is preferable that the above-described camera of the second aspect further includes an image processing section which performs gradation conversion processing on an output from the imaging section. It is preferable that the image processing section changes a gradation characteristic in the gradation conversion processing based on a difference between the exposure value obtained in the exposure calculating section and the highest value. Further, it is more preferable that the image processing section uses a gradation characteristic in which an output gradation value changes more largely as the difference is larger in an area having a small gradation value.

In the above-described camera of the second aspect, it is preferable that the correction calculating section obtains a correction value for correction of the exposure value to a more under side as the difference is larger.

A method of imaging according to a third aspect of the present invention includes the steps of: obtaining photometry values at a plurality of positions of a subject; obtaining an exposure value when photographing based on the photometry values; obtaining a correction value for correction of the exposure value based on a highest value among photometry values belonging to a predetermined range out of the plurality of photometry values; and controlling an exposure based on the correction value and imaging an image of the subject.

In the above-described method of imaging of the third aspect, it is preferable that the highest value is a highest value among photometry values equal to or smaller than a predetermined value out of the plurality of photometry values.

In the above-described method of imaging of the third aspect, it is preferable that the correction value is a value for correction of the exposure value to an under side.

In the above-described method of imaging of the third aspect, it is preferable that in the step of obtaining the exposure value, a facial part of a person as the subject is detected, and the exposure value is obtained based on a photometry value corresponding to the facial part out of the plurality of photometry values.

It is preferable that the above-described method of imaging of the third aspect further includes the step of performing gradation conversion processing on an image obtained in the step of imaging the image of the subject. It is preferable that in the step of performing the gradation conversion processing, a gradation characteristic in the gradation conversion processing is changed based on a difference between the exposure value and the highest value. Further, it is more preferable that in the step of performing the gradation conversion processing, a gradation characteristic in which an output gradation value changes more largely as the difference is larger in an area having a small gradation value is used. Moreover, it is preferable that in the step of obtaining the correction value, a correction value for correction of the exposure value to a more under side as the difference is larger is obtained.

A method of imaging according to a fourth aspect of the present invention includes the steps of: obtaining photometry values at a plurality of positions of a subject; obtaining an exposure value when photographing based on the photometry values; obtaining a correction value for correction of the exposure value based on a difference between the exposure value and a second highest photometry value excluding a highest value out of the plurality of photometry values; and controlling an exposure based on the correction value and imaging an image of the subject.

In the above-described method of imaging of the fourth aspect, it is preferable that in the step of obtaining the correction value, a correction value for correction of the exposure value to a more under side as the difference is larger is obtained.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, an embodiment of the present invention will be described using the drawings.

Figure 1:
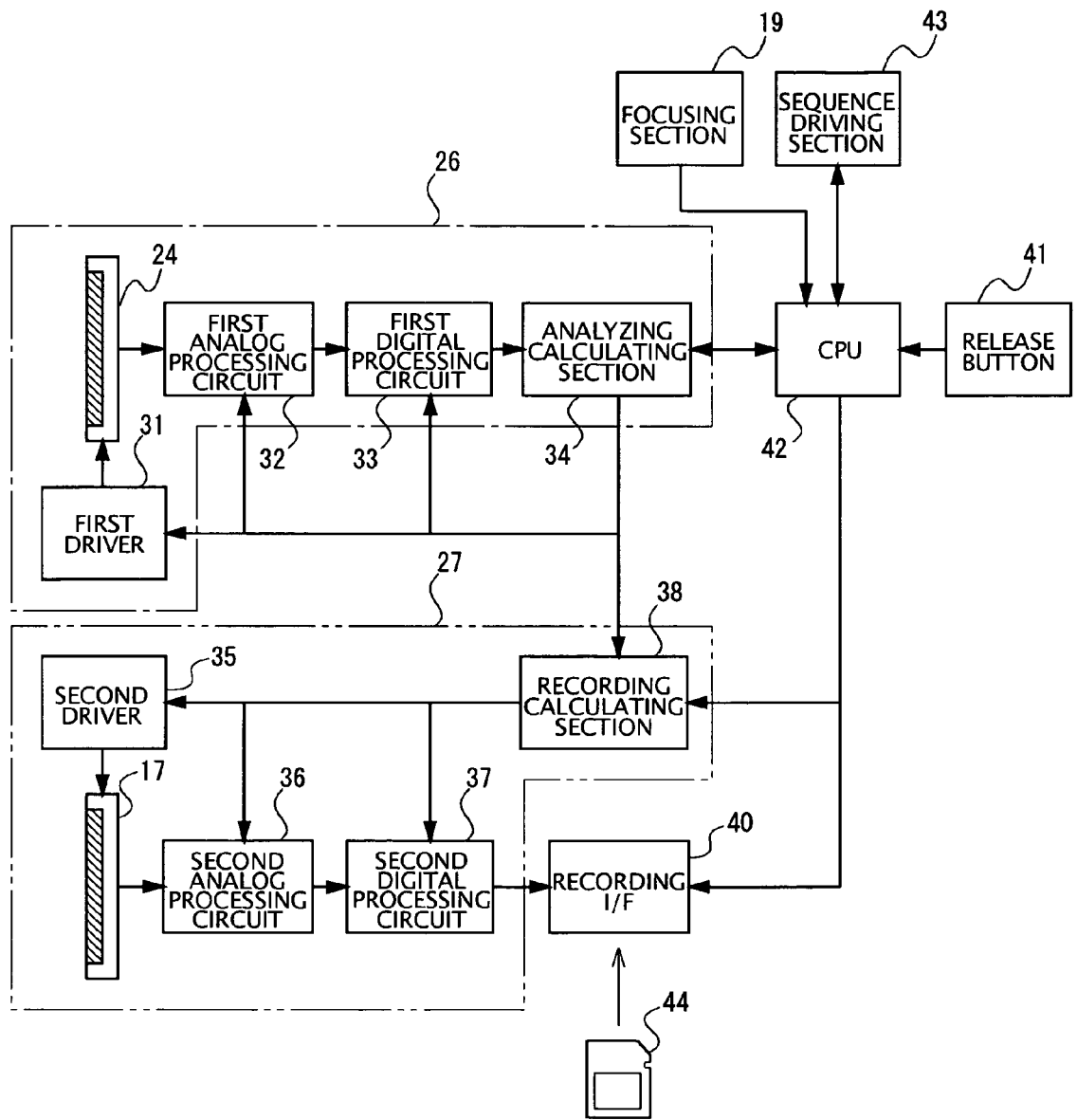
FIG. 1 is a block diagram showing a configuration of an electronic camera of an embodiment.
Figure 2:
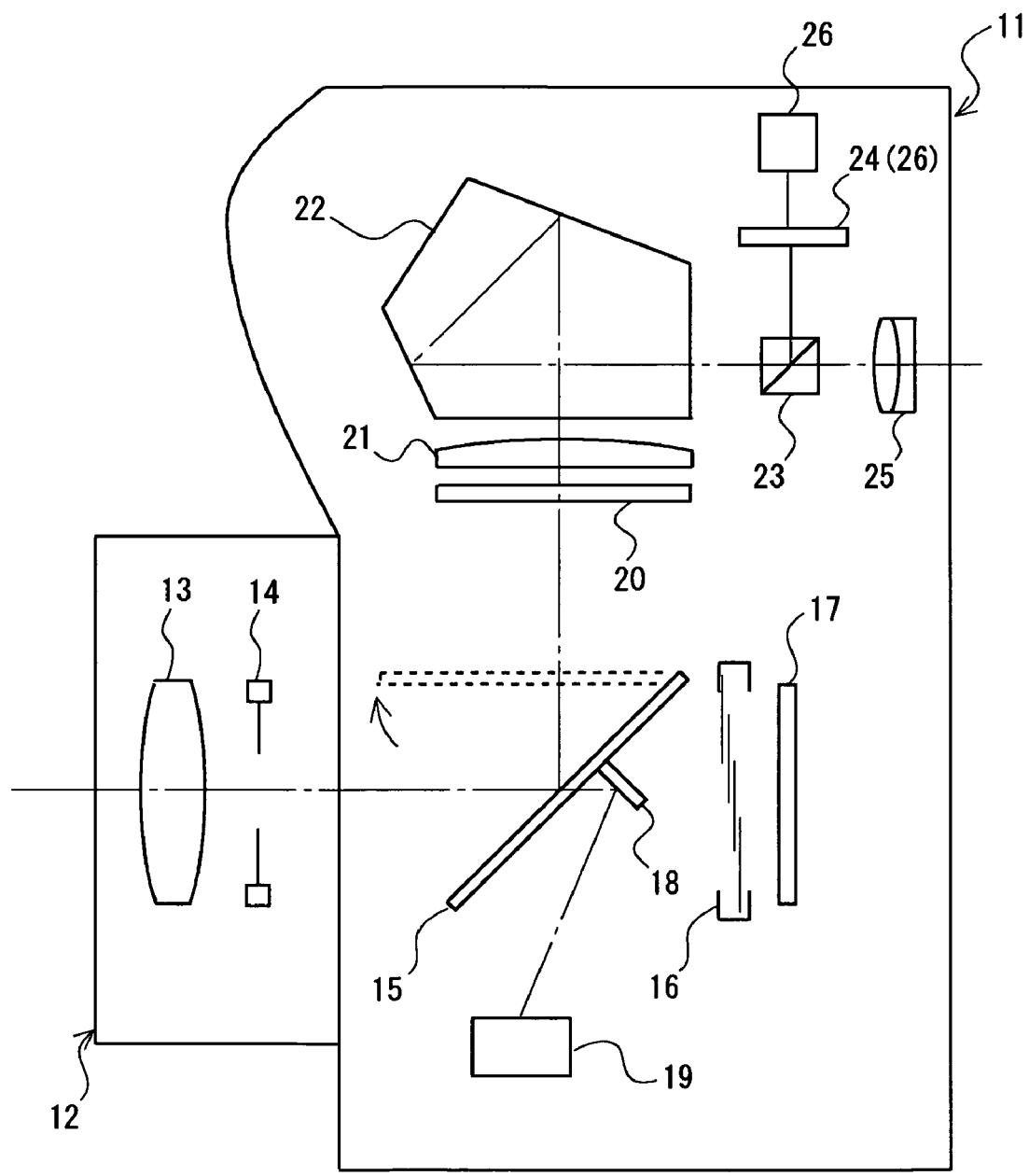
FIG. 2 is a schematic view showing a photographing mechanism of the electronic camera of this embodiment.

FIG. 1 is a block diagram showing the structure of an electronic camera of this embodiment. FIG. 2 is a schematic view showing a photographing mechanism of the electronic camera of this embodiment. Note that in this embodiment an example of a single lens reflex type electronic camera system with a replaceable lens is explained.

First, with reference to FIG. 2, the imaging mechanism of the electronic camera will be explained. The electronic camera of this embodiment has a camera body 11 and a lens unit 12 accommodating an imaging optical system.

Here, the camera body 11 and the lens unit 12 are provided with a pair of mounts (not-shown) in male/female relationship respectively. The lens unit 12 is connected in a replaceable manner to the camera body 11 by coupling the mounts with a bayonet mechanism or the like. Also, the mounts are each provided with an electric contact. When the camera body 11 and the lens unit 12 are connected, an electrical connection of the both is established by the electric contacts in contact with each other.

The lens unit 12 has a focusing lens 13 for adjusting a focusing position and an aperture 14. The focusing lens 13 is constructed to be movable in an optical axis direction by a not-shown motor. The aperture 14 adjusts an amount of incident light to the camera body 11 by opening/closing a diaphragm blade. Note that operations of the focusing lens 13 and the aperture 14 are controlled by a not-shown lens microcomputer accommodated in the lens unit 12.

The camera body 11 has a main mirror 15, a mechanical shutter 16, a recording-purpose image pickup device 17, a sub-mirror 18, a focusing section 19, and a viewfinder optical system. The mail mirror 15, the mechanical shutter 16 and the recording-purpose image pickup device 17 are arranged along the optical axis of the imaging optical system. The sub-mirror 18 is arranged behind the main mirror 15. Further, the viewfinder optical system is arranged on an upper side of the camera body 11, which allows observation of an image made by the optical flux of a subject reflected by the main mirror 15. Furthermore, the focusing section 19 is arranged on a lower side of the camera body 11, which is constructed to perform focusing by detecting the optical flux of the subject which is transmitted through the main mirror 15 and reflected by the sub-mirror 18.

The main mirror 15 is pivotally supported rotatably by a not-shown rotary shaft, and can be switched between an observation state and a retracted state. The main mirror 15 in the observational state is obliquely arranged on a front side of the mechanical shutter 16 and the recording-purpose image pickup device 17. The main mirror 15 in this observation state reflects an optical flux passed through the imaging optical system upward and leads the optical flux to the viewfinder optical system. Further, a center portion of the main mirror 15 is a half mirror. Then, a part of flux transmitted through the main mirror 15 is refracted downward by the sub-mirror 18 and lead to the focusing section 19. Note that the focusing section 19 detects an amount of image displacement of a subject image divided by a not-shown separator lens.

On the other hand, the main mirror 15 in the retracted state is flipped upward together with the sub-mirror 18 and is at a position out of an imaging optical path. When the main mirror 15 is in the retracted state, the optical flux passing through the imaging optical system is lead to the mechanical shutter 16 and the recording-purpose image pickup device 17.

The finder optical system has a diffusing screen (focus plate) 20, a condensing lens 21, a pentagonal prism 22, a beam splitter 23, an analyzing-purpose image pickup device 24, and an eyepiece lens 25. The diffusing screen 20 is positioned on an upper side of the main mirror 15, and focuses the optical flux reflected by the main mirror 15 in the observation state once. The optical flux focused on the diffusing screen 20 passes through the condensing lens 21 and the pentagonal prism 22 and is lead from an exit plane at an angle of 90° with an incident plane of the pentagonal prism 22 to the beam splitter 23. The beam splitter 23 divides the incident flux into two directions. One flux passing through the beam splitter 23 is lead to the analyzing-purpose image pickup device 24 via a not-shown secondary focusing lens, and is processed by the analyzing processing circuit 26 as will be described later. Further, the other optical flux passing through the beam splitter 23 reaches the user's eye via the eyepiece lens 25.

Next, a circuit configuration of the electronic camera will be described with reference to FIG. 1. The camera body 11 has the analyzing processing circuit 26, a recording processing circuit 27, a recording I/F 40, a release button 41, a CPU 42, and a sequence driving section 43.

The analyzing processing circuit 26 has the analyzing-purpose image pickup device 24, a first driver 31, a first analog processing circuit 32, a first digital processing circuit 33, and an analyzing calculating section 34.

The analyzing-purpose image pickup device 24 is a sensor for analyzing the condition of a subject inside the photographic screen. The analyzing-purpose image pickup device 24 has a light-receiving surface in which light-receiving elements are arranged two-dimensionally. Then, the analyzing-purpose image pickup device 24 photoelectrically converts a subject image passing through the viewfinder optical system and being focused on the light-receiving surface to generate an analog image signal. An output signal of the analyzing-purpose image pickup device 24 is inputted to the first analog processing circuit 32.

As an example, the analyzing-purpose image pickup device 24 of this embodiment has approximately 320×200 number of pixel, and a front plane of the light-receiving surface is constituted of an image pickup device on which a color filter array according to a publicly known Bayer arrangement is arranged. Note that the analyzing-purpose image pickup device 24 may either be of sequential charge transfer method (CCD or the like) or XY address method (CMOS or the like).

The first driver 31 supplies a timing pulse to the analyzing-purpose image pickup device 24 in response to an instruction from the analyzing calculating section 34 and controls various operations (storing and reading out of a signal charge, discharging of unnecessary charges) of the analyzing-purpose image pickup device 24.

The first analog processing circuit 32 is an analog front-end circuit having a CDS circuit, a gain circuit, an A/D converting circuit, and so forth. The CDS circuit reduces noise components in output of the analyzing-purpose image pickup device 24 by correlated double sampling. The gain circuit amplifies and outputs the gain of an input signal. The A/D converting circuit A/D converts an output signal of the analyzing-purpose image-pickup device 24. Note that in FIG. 1, respective circuits of the first analog processing circuit 32 are omitted.

The first digital processing circuit 33 executes various image processing such as color interpolation processing on an output signal of the first analog processing circuit 32.

The analyzing calculating section 34 controls respective sections of the analyzing processing circuit and performs various calculation processing for analyzing the condition of a subject inside the photographic screen. For example, the analyzing calculating section 34 executes a publicly known exposure calculation based on an output of the first digital processing circuit 33. Further, the analyzing calculating section 34 also executes a face detecting processing which will be described later based on an output of the first digital processing circuit 33.

Here, the analyzing calculating section 34 of this embodiment particularly performs the following processing.

(1) The analyzing calculating section 34 calculates an exposure correction value for correcting a proper exposure value based on a difference value between the proper exposure value for the photographic screen and an upper limit luminance value (highest value) in a predetermined luminance range to be reproduced in a scene in the photographic screen. This exposure correction value corrects the proper exposure value to an under side according to the difference value.

(2) The analyzing calculating section 34 determines a proper gradation characteristic for gradation conversion processing of a photographed image based on the difference value in (1). For example, the analyzing calculating section 34 selects gradation characteristic data according to the difference value from a plurality of gradation characteristic data, which are prepared in a memory (not shown) or the like in advance. Respective gradation characteristic data show curves representing different correspondences of an input gradation value and an output gradation value respectively.

Figure 3:
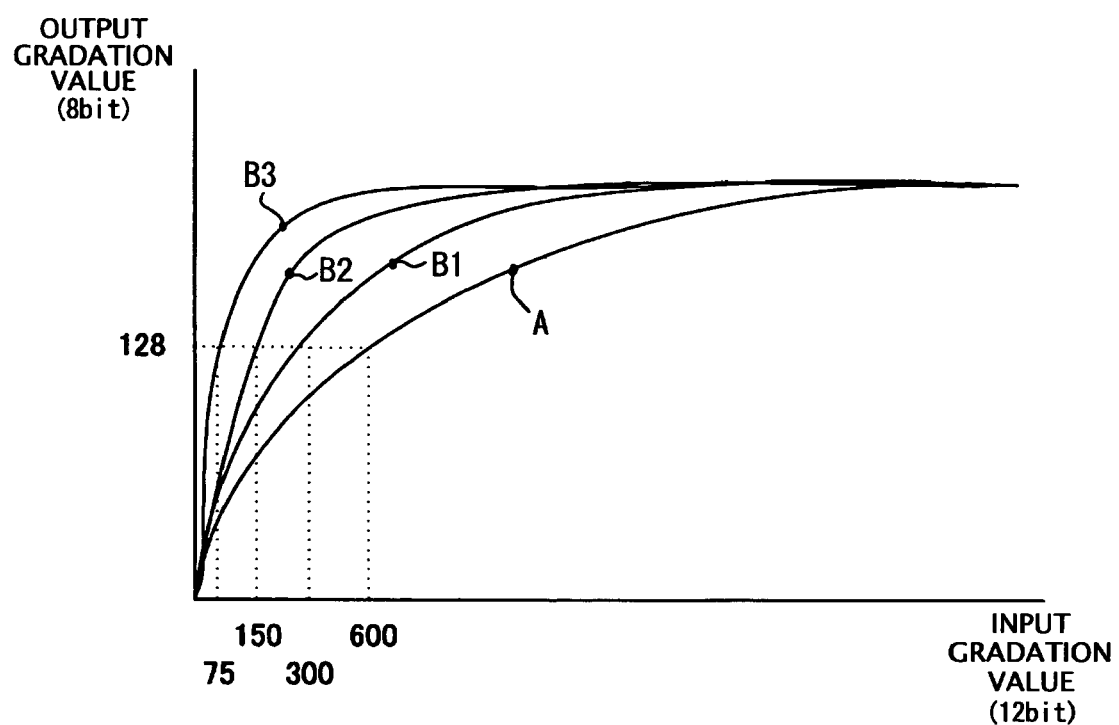
FIG. 3 is a graph showing an example of gradation characteristic data of this embodiment.

An example of the gradation characteristic data in this embodiment is shown in FIG. 3. A curve A in FIG. 3 shows a standard gradation characteristic corresponding to the proper exposure value. Further, curves B1, B2, B3 show gradation characteristics which the analyzing calculating section 34 selects depending on a difference value from the proper exposure value. With FIG. 3, a case that the input gradation is 12 bits (0 to 4095), the output gradation is 8 bits (0 to 256) will be explained.

On the curves B1, B2, B3 shown in FIG. 3, the output gradation value changes largely in an area where the input gradation value is smaller as compared to the curve A. For example, the input gradation value by which the output gradation value becomes a standard output value (for example, 128 by 8 bits) is 600 on the curve A, whereas it is 300 on the curve B1, 150 on the curve B2, and 75 on the curve B3. Thus, on the curves B1, B2, B3, black saturation does not occur easily in the photographed image when the input gradation value is small. Note that the output gradation value is not increased when the input characteristic value is large, so that white saturation does not occur either. In other words, by the gradation characteristic data of the curves B1, B2, B3, the photographed image can be recorded with a wider dynamic range compared to the standard gradation characteristic data (curve A).

Returning to FIG. 1, the recording processing circuit 27 has the recording-purpose image pickup device 17, a second driver 35, a second analog processing circuit 36, a second digital processing circuit 37, and a recording calculating section 38. Note that in the recording processing circuit 27, part of explanation of ones having the same functions as those in the configuration of the analyzing processing circuit 26 is omitted.

The recording-purpose image pickup device 17 is a sensor for photographing a subject in the photographic screen to generate photographed image data. This recording-purpose image pickup device 17 photoelectrically converts a subject image passing through the imaging optical system and being focused on the light-receiving surface to generate an analog image signal. In this embodiment, an image pickup device having the same structure as the analyzing-purpose image pickup device 24 is used for the recording-purpose image pickup device 17. As a matter of course, the recording-purpose image pickup device 17 and the analyzing-purpose image pickup device 24 may be image pickup devices having different structures respectively.

The second driver 35 supplies a timing pulse to the recording-purpose image pickup device 17 in response to an instruction from the recording calculating section 38 and controls various operations of the recording-purpose image pickup device 17.

The second analog processing circuit 36 has a CDS circuit, a gain circuit, an A/D converting circuit, and so forth. Here, in the gain circuit of the second analog processing circuit 36, adjustment is performed on imaging sensitivity which corresponds to ISO sensitivity in response to an instruction from the recording calculating section 38. Further, in this embodiment, the gradation of a digital image signal outputted from the A/D converting circuit is set to 12 bits.

The second digital processing circuit 37 executes various image processing (defective pixel correction, color interpolation, gradation conversion processing, white balance adjustment, edge enhancement) on the output signal from the second analog processing circuit 36 to generate photographed image data. Particularly, the second digital processing circuit 37 of this embodiment executes gradation conversion processing, which changes an image signal with an input gradation of 12 bits to an image signal with an output gradation of 8 bits, based on the gradation characteristic instructed by the recording calculating section 38. Further, the second digital processing circuit 37 executes compression/decompression processing of photographed image data, and the like.

The recording calculating section 38 executes various controls of the recording processing circuit, and sets parameters for image processing. Note that in this embodiment, when photographing is performed with exposure based on the aforementioned exposure correction value, the recording calculating section 38 sets parameters for the gradation characteristic in response to an instruction from the analyzing calculating section 34.

Further, the recording calculating section 38 generates a header file in which additional data such as photographing condition are recorded in a predetermined format. Note that this header file is associated with corresponding photographed image data to constitute one data file.

In the recording I/F 40, a connector for connecting a recording medium 44 is formed. Then the recording I/F 40 executes writing/reading of photographed image data to/from the recording medium 44 connected to the connector. The recording medium 44 is constituted of a card type recording medium or the like, which includes a semiconductor memory. Note that in FIG. 1 a card type recording medium is shown as an example of the recording medium 44.

The release button 41 receives from the user an instruction input to start an exposure operation.

The CPU 42 controls the operation of the entire electronic camera system according to a predetermined sequence program. Further, the CPU 42 calculates a defocus amount by a phase difference detection method based on an output from the focusing section 19. Note that the CPU 42 can switch the control when photographing depending on a photographing mode selected by the user.

The sequence driving section 43 drives the main mirror 15, the mechanical shutter 16, and so on by an instruction of the CPU 42. Further, the sequence driving section 43 outputs information such as aperture value and defocus amount to the aforementioned lens microcomputer via the mounts.

Figure 4:
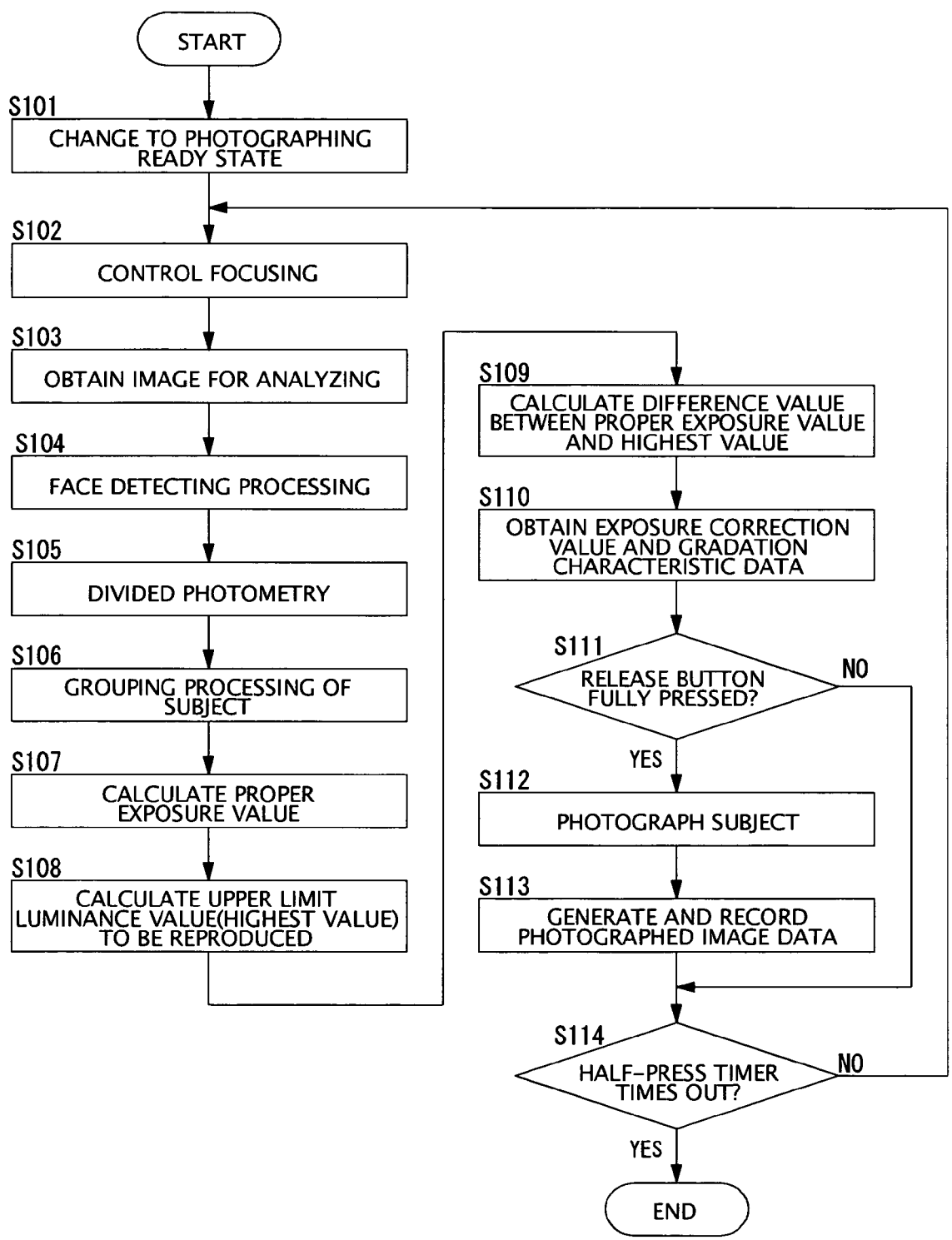
FIG. 4 is a flowchart showing a photographing operation of the electronic camera of this embodiment.

Hereinafter, the operation of the electronic camera of this embodiment will be described with reference to a flowchart of FIG. 4.

Step 101: upon reception of a half-press input (operation of a first stroke) of the release button 41 by the user, the CPU 42 of the camera body 11 changes from a power saving state to a photographing ready state. Specifically, the CPU 42 starts up a sequence program for photographing, and also turns on the analyzing processing circuit 26, the recording processing circuit 27, the sequence driving section 43, and so forth. Note that in S101, the main mirror 15 is at the position of the observation state.

Step 102: The CPU 42 instructs the focusing section 19 to control focusing. The CPU 42 obtains an amount of image displacement in each focusing area from the focusing section 19. Then the CPU 42 calculates a defocus amount of a focusing area selected by a predetermined algorithm (such as giving priority to a close distance or a center for example). Thereafter the lens microcomputer drives the focusing lens 13 based on the defocus amount.

Step 103: The CPU 42 instructs the analyzing processing circuit 26 to obtain an image for analyzing the subject in the photographic screen. The analyzing calculating section 34 initializes the analyzing-purpose image pickup device 24 by discharging unnecessary charges therefrom, and thereafter drives the analyzing-purpose image pickup device 24 to obtain the image for analyzing the subject. Note that the output of the analyzing-purpose image pickup device 24 is inputted to the analyzing calculating section 34 via the first analog processing circuit 32 and the first digital processing circuit 33. Accordingly, the above image data is in a state of being color interpolated by the first digital processing circuit 33.

Step 104: The CPU 42 causes the analyzing calculating section 34 to execute face detecting processing based on the image from S103. Accordingly, the analyzing calculating section 34 obtains information on position and size of a face area in the photographic screen. This is because it is highly possible in general that the face of a person is the main subject, and thus by the face detecting processing, the main subject in the photographic screen can be estimated easily. Note that when several faces are detected in the face detecting processing, the analyzing calculating section 34 takes a face area on a closer side where the area of the face is largest as the main subject.

Such face detecting processing is carrier out by publicly known means. For example, the analyzing calculating section 34 can extract a face area from the aforementioned image by characteristic point extraction processing of Japanese Unexamined Patent Application Publication No. 2001-16573 or the like. Examples of the characteristic point include opposite ends of eyebrows, eyes, nose, and lips, in addition to contour points of a face, a vertex point, an end point of a jaw, and the like. Alternatively, as in the Japanese Unexamined Patent Application Publication No. H08-63597, the analyzing calculating section 34 may extract the contour of flesh color area based on color information of a subject, and may further perform matching with templates of facial parts prepared in advance to thereby detect a face.

Here, the CPU 42 may switch execution/non-execution of the face detecting processing depending on the setting of photographing mode. For example, when a photographing mode suitable for photographing a person (such as portrait photographing mode) is selected, the CPU 42 executes the face detecting processing. On the other hand, when a photographing mode not intended for photographing a person is selected, or when the position of a main subject is determined by a focusing area selected in S102, the CPU 42 omits the face detecting processing of S104. Further, the CPU 42 can also enable automatic focusing to a face detected in the face detecting processing. In this case, the CPU 42 can omit the aforementioned focusing operation in S102.

Step 105: The analyzing calculating section 34 executes divided photometry in the photographic screen based on the image obtained in S103 to obtain luminance values corresponding to respective pixels or groups of plural pixels of the aforementioned image respectively.

Figure 5:
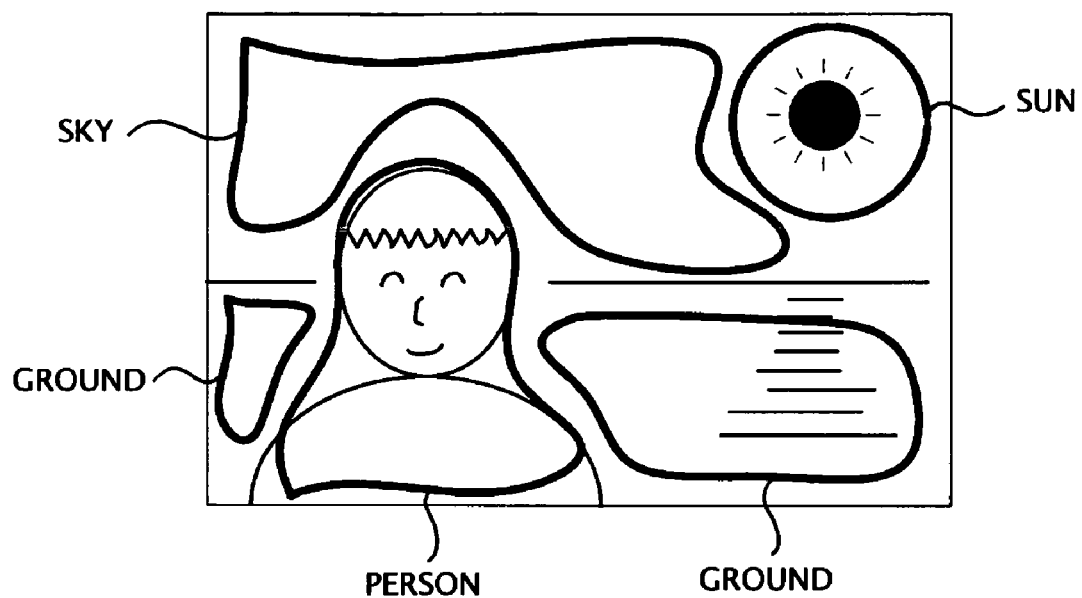
FIG. 5 is a schematic view showing an example of a state that subjects in a photographic screen are grouped.
Figure 6:
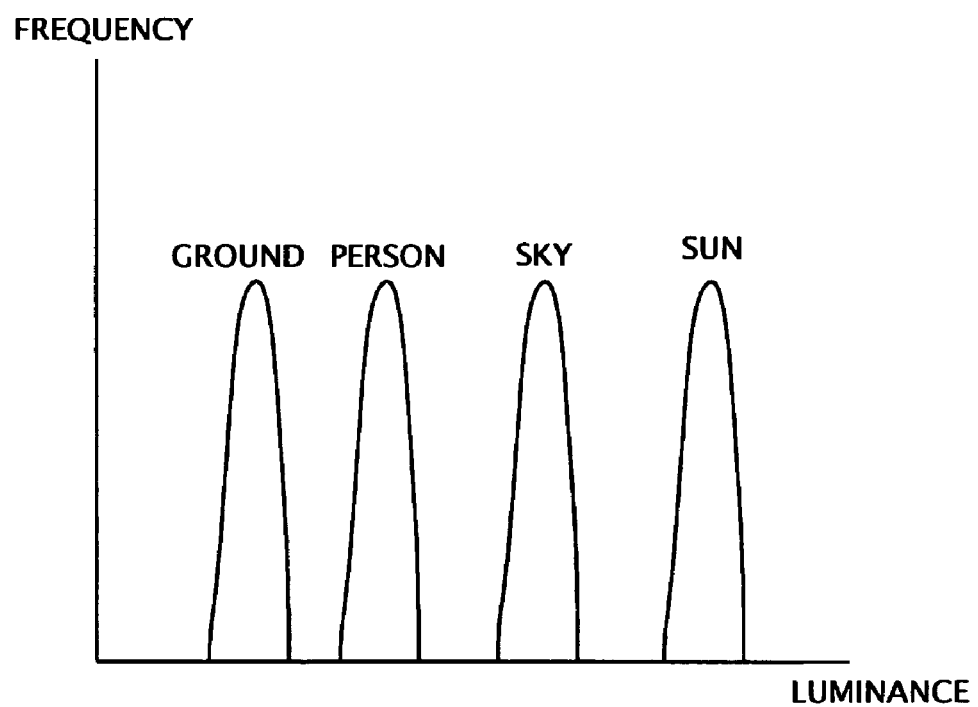
FIG. 6 is a graph of histograms showing a distribution of average luminance values of the respective groups in FIG. 5.

Step 106: The analyzing calculating section 34 executes grouping processing of subjects in the photographic screen by analyzing the image obtained in S103. Then the analyzing calculating section 34 calculates an average luminance value for each of the grouped areas. FIG. 5 shows an example of a state that subjects in the photographic screen are grouped. Further, FIG. 6 shows histograms showing a distribution of average luminance values of the respective groups in FIG. 5.

Such grouping processing is performed by publicly known means. Specifically, when certain adjacent pixels have approximately the same luminance values or hues as each other in the image obtained in S103, the analyzing calculating section 34 assumes that these pixels belong to the same subject and hence groups them. For example, the analyzing calculating section 34 executes the grouping processing by a method disclosed in Japanese Unexamined Patent Application Publication No. H04-257831, No. H04-310930, or the like. Note that the analyzing calculating section 34 may be configured to perform grouping using a result of the above-described face detecting processing.

Step 107: The analyzing calculating section 34 obtains a proper exposure value for photographing a subject in the photographic screen by publicly known exposure calculation based on the luminance value obtained in S105. At this time, the analyzing calculating section 34 calculates the proper exposure value so that the average luminance value (obtained in S106) of the group including the aforementioned main subject becomes the standard output value of the photographed image.

Step 108: The analyzing calculating section 34 obtains an upper limit luminance value (highest value) in a predetermined luminance range to be reproduced in a scene in the photographic screen, out of the average luminance values (obtained in S106) of the respective groups.

First, the analyzing calculating section 34 excludes from objects of calculation for the highest value a group showing an average luminance value larger than a predetermined value (for example, 11.3 BV). Then the analyzing calculating section 34 determines the highest one among the average luminance values of the respective groups as objects of calculation as the highest value. For example, in FIG. 5 and FIG. 6, when the group including the sun has an average luminance value exceeding the predetermined value, the average luminance value of a group including the sky among the groups excluding the group including the sun is determined as the highest value.

Step 109: The analyzing calculating section 34 calculates a difference value dBV between the proper exposure value (obtained in S107) and the highest value (obtained in S108)

Step 110: The analyzing calculating section 34 obtains the exposure correction value and the gradation characteristic data based on the difference value dBV (obtained in S109). In this S110, the analyzing calculating section 34 performs judgment based on a reference value S (EV) calculated by the following equation (1). Here, respective symbols in the equation (1) are explained. A is an input gradation value corresponding to a saturation level. B is an input gradation value corresponding to the standard value of the output gradation value.

$$S = \text{Log}_2(A/B) \tag{1}$$

Hereinafter, the processing in S10 in this embodiment will be explained with a specific example. As an example, the value of A is 3600 and the value of B is 600 when the input gradation is 12 bits (0 to 4095) and the output gradation is 8 bits (0 to 255). Further, the standard value of the output gradation value corresponding to B is 128. With the above conditions, the equation (1) gives the reference value S of approximately 2.6 EV.

First, a case of the difference value dBV being smaller than 2.6 EV (dBV<2.6) will be explained. In this case, it is possible to sufficiently reproduce a subject on a high luminance side in the photographic screen even by performing photographing with the proper exposure value and applying the standard gradation characteristic data (curve A). Therefore, the analyzing calculating section 34 sets the exposure correction value to 0 (zero). Further, the analyzing calculating section 34 selects the standard gradation characteristic data.

Next, a case of the difference value dBV being 2.6 EV or larger will be explained. In this case, the difference in luminance in the photographic screen is large, and thus the subject on the high luminance side will be saturated in the photographed image when the setting is the same as in the case of dBV being smaller than 2.6 EV. Accordingly, the analyzing calculating section 34 changes the exposure correction value and the gradation characteristic data in stages as follows according to the difference value dBV.

(1) When the difference value dBV is equal to or larger than 2.6 EV and smaller than 3.6 EV (2.6≦dBV<3.6), the analyzing calculating section 34 sets the exposure correction value to −1. Further, the analyzing calculating section 34 selects the gradation characteristic data of the curve B1.

(2) When the difference value dBV is equal to or larger than 3.6 EV and smaller than 4.6 EV (3.6≦dBV<4.6), the analyzing calculating section 34 sets the exposure correction value to −2. Further, the analyzing calculating section 34 selects the gradation characteristic data of the curve B2.

(3) When the difference value dBV is equal to or larger than 4.6 EV (4.6≦dBV), the analyzing calculating section 34 sets the exposure correction value to −3. Further, the analyzing calculating section 34 selects the gradation characteristic data of the curve B3.

Figure 7:
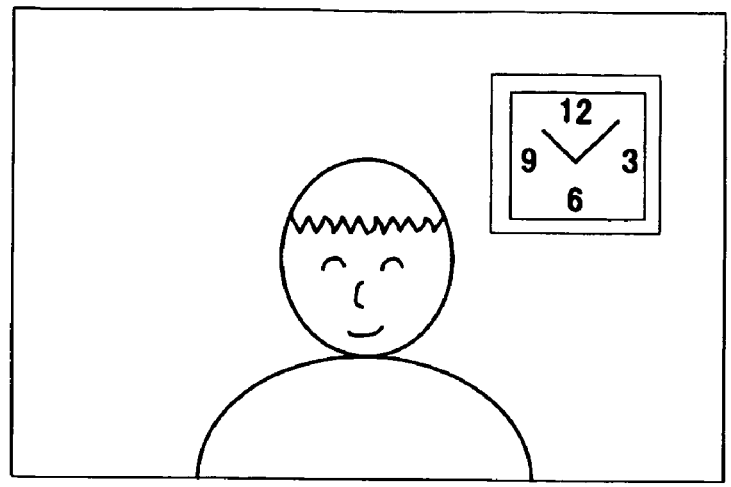
FIG. 7 is a view showing a scene (indoor photographing) in which the difference in luminance is relatively small in the photographic screen.
Figure 8:
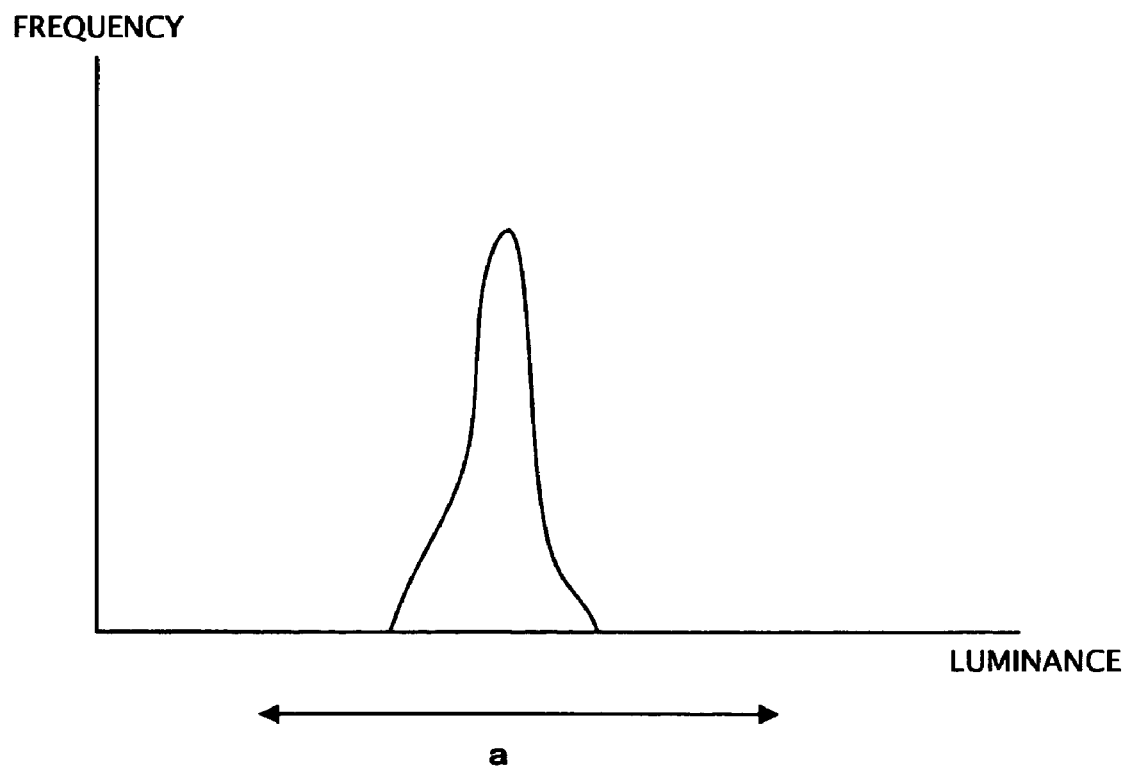
FIG. 8 is a view showing a luminance histogram of the scene in FIG. 7.

Here, in S110, the reason for adjusting the exposure correction value and the gradation characteristic data will be described. FIG. 7 shows a scene (indoor photographing) in which the difference in luminance is relatively small in the photographic screen. FIG. 8 shows a luminance histogram of the scene in FIG. 7. In the scene in FIG. 7, the luminance in the photographic screen can be recorded even by the dynamic range (range a shown in FIG. 8) which is realized by the standard gradation characteristic (curve A in FIG. 3).

Figure 9:
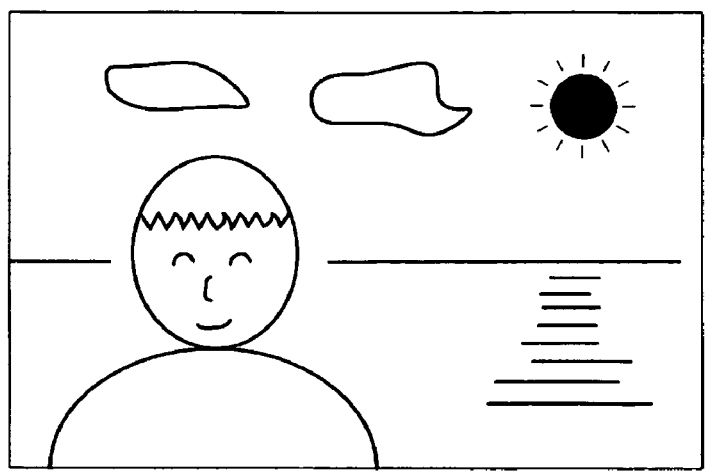
FIG. 9 is a view showing a scene (photographing against light under fine weather) having a large difference in luminance in the photographic screen.
Figure 10:
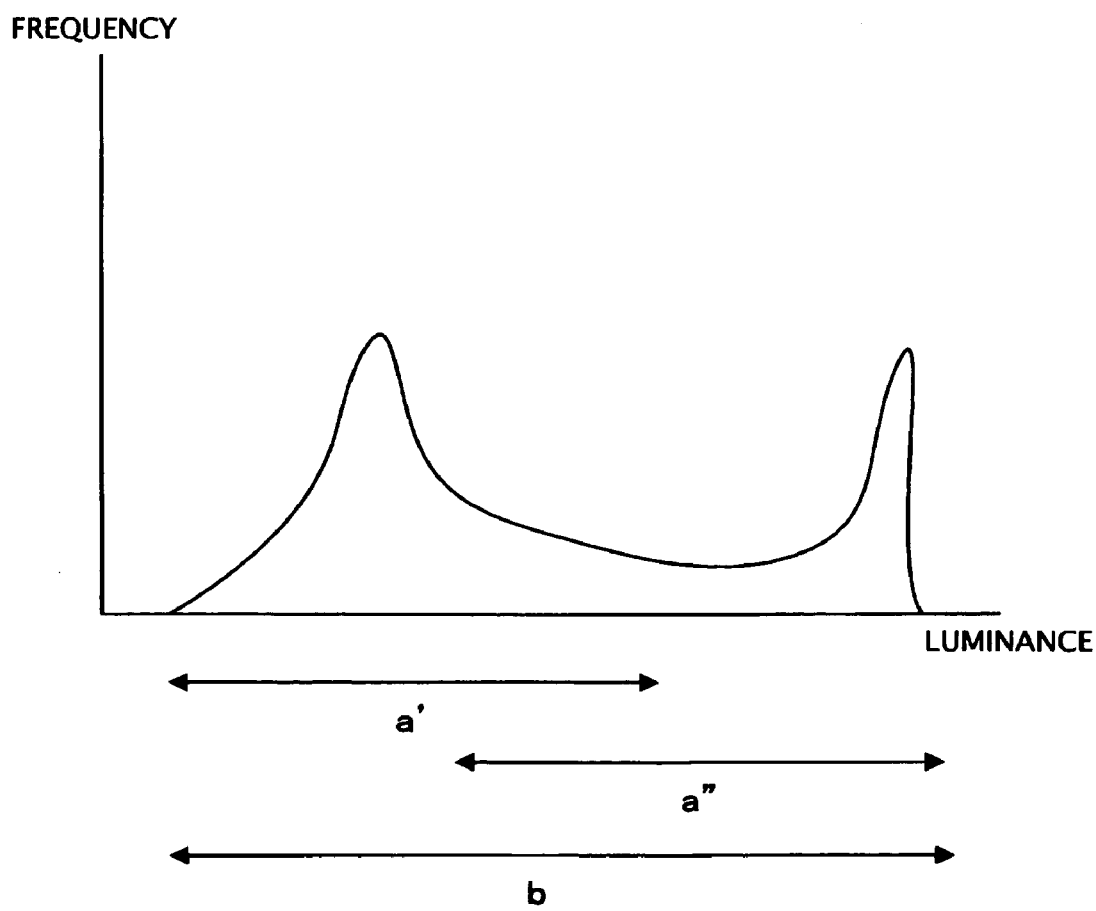
FIG. 10 is a view showing a luminance histogram of the scene in FIG. 9.

On the other hand, FIG. 9 shows a scene (photographing against light under fine weather) having a large difference in luminance in the photographic screen. FIG. 10 shows a luminance histogram of the scene in FIG. 9. In the scene in FIG. 9, the difference in luminance in the photographic screen is large, and thus the luminance in the photographic screen cannot be recorded with the same dynamic range as a in FIG. 8.

Figure 11:
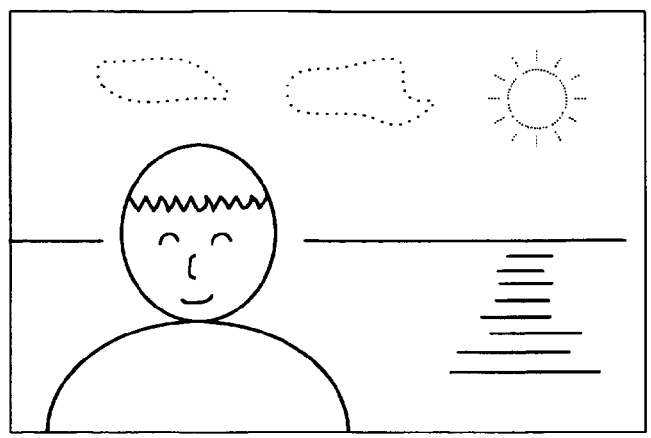
FIG. 11 is a view showing an example of an image photographing the scene in FIG. 9.
Figure 12:
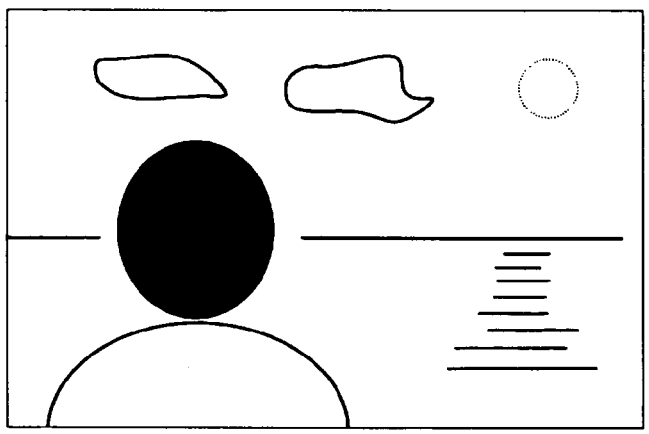
FIG. 12 is a view showing an example of an image photographing the scene in FIG. 9.

For example, in the case where the exposure is matched to a subject having a low luminance in the above dynamic range (case of a' shown in FIG. 10), a subject having a high luminance (such as sun, cloud, or the like) in the photographic screen over flows to cause white saturation (refer to FIG. 11). Further, in the case where the exposure is matched to a subject having a high luminance in the above dynamic range (case of a" shown in FIG. 10), a subject having a low luminance (person) in the photographic screen under flows to cause black saturation (refer to FIG. 12). Accordingly, in such cases, in this embodiment, the gradation characteristics (curves B1, B2, B3 in FIG. 3) corresponding to b in FIG. 10 are applied.

Incidentally, when the gradation characteristic is changed to the curve B1 or the like as described above, the output gradation value becomes the standard value by a smaller input gradation value. Therefore, it is possible to make the input gradation value when photographing smaller by correcting the exposure when photographing to an under side. Here, when the exposure for a scene having a large difference in luminance is corrected to the under side, also the input gradation value of a high-luminance subject becomes small naturally. Specifically, the high-luminance subject whose input gradation value reached the saturation level to cause white saturation by the exposure with the proper exposure value can be reproduced on the photographic screen by reduction of the input gradation value by setting the exposure to the under side. From the above points, in this embodiment the exposure is corrected to the under side by the exposure correction value.

Figure 13:
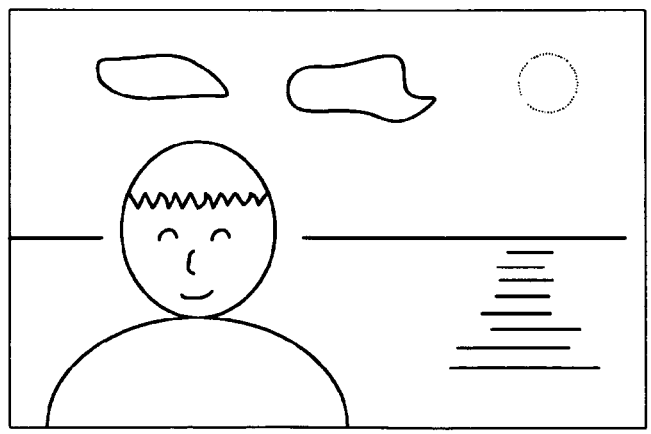
FIG. 13 is a view showing a photographed image of photographing the scene in FIG. 9 based on the exposure correction value in which a gradation characteristic is changed.

FIG. 13 shows a photographed image of photographing the scene in FIG. 9 on the under side based on the exposure correction value in which the gradation characteristic is changed. In this case, being different from FIG. 11 and FIG. 12, the person on the near side to clouds in the background are reproduced in the photographed image.

Step 111: CPU 42 judges whether the release button 41 is fully pressed or not. When it is fully pressed (YES side), the process goes to S112. On the other hand, when it is not fully pressed (NO side), the process goes to S114.

Step 112: CPU 42 instructs the sequence driving section 43 and the recording calculating section 38 to perform photographing. The sequence driving section 43 causes the main mirror 15 to retract from the imaging optical path. Further, the recording calculating section 38 photographs a subject image by driving the recording-purpose image pickup device 17. During this photographing, the sequence driving section 43 and the recording calculating section 38 performs controlling of exposure based on the proper exposure value (obtained in S107) and the exposure correction value (obtained in S110).

Step 113: The recording calculating section 38 generates photographed image data from the output of the recording-purpose image pickup device 17. At this time, the second digital processing circuit 37 executes the gradation conversion processing based on the gradation characteristic data selected in S110. Then the photographed image data is recorded finally in the storage medium 44.

Step 114: CPU 42 judges whether a predetermined time has passed from the half-pressing of the release button 41 (a half-press timer times out) or not. When the half-press timer times out (YES side), the CPU 42 cuts off the power of the analyzing processing circuit, the recording processing circuit, the sequence driving section 43, and so forth to return to the power-saving mode, and thus completes the photographing operation. On the other hand, when the half-press timer has not timed out (NO side), the CPU 42 returns to S102 to repeat the above-described operation.

Further, in this embodiment, it is possible to allow the recording calculating section 38 to generate RAW image data in S113. When the RAW image data is generated, the second digital processing circuit 37 does not perform any kind of image processing, and thereby records digital data of every pixel in the image pickup device in a state of not being processed. Further, the recording calculating section 38 records the photographing condition data, which is needed during digital development processing, in the header file of the RAW image data. This photographing condition data includes, for example, information such as combination of the above-described proper exposure value (obtained in S107) and the highest value (obtained in S108) or the difference value (obtained in S109).

Figure 14:
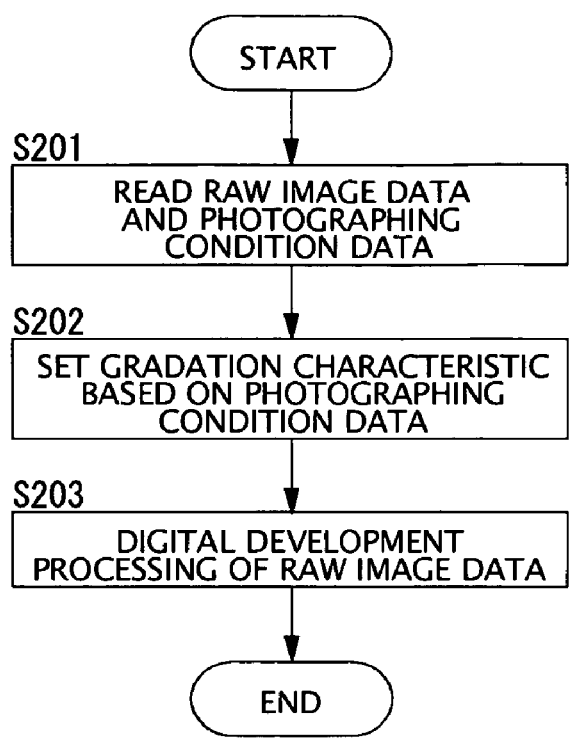
FIG. 14 is a flowchart showing the operation of the electronic camera when RAW image data is subjected to digital development processing.

FIG. 14 is a flowchart showing the operation of the electronic camera when the above RAW image data is subjected to digital development processing.

Step 201: The CPU 42 reads the above RAW image data from the recording medium 44 together with the photographing condition data.

Step 202: The recording calculating section 38 selects gradation characteristic data suitable for processing of the RAW image data based on the combination of the proper exposure value and the highest value or the difference value in the information of the photographing condition data. Specific contents of this processing in S202 overlap with the above-described S109 and S110, and thus detailed explanation thereof is omitted.

Step 203: The recording calculating section 38 instructs the second digital processing circuit 37 to perform digital development processing of the RAW image data. At this time, the second digital processing circuit 37 executes gradation conversion processing based on the above-described gradation characteristic data. Accordingly, photographed image data similar to the data generated in the above-described S113 can be generated.

Hereinafter, effects of this embodiment will be described.

In this embodiment, based on the difference value between the proper exposure value (obtained in S107) and the highest value (obtained in S108), the analyzing calculating section 34 automatically adjusts the exposure correction value and the gradation characteristic data (S110). Particularly, in this embodiment, white saturation of a subject on a high-luminance side does not easily occur owing to the exposure correction with the exposure correction value, and also black saturation of a subject on a low-luminance side does not easily occur since a dark subject becomes bright by gradation conversion. Therefore, according to this embodiment, a photographed image of a scene having a large difference in luminance can be reproduced with a dynamic range having an appropriate width, without requiring the user to perform any complicated operation.

Additional Matters to the Embodiment (1) The electronic camera according to the present invention is not limited to the single lens reflex type, and may be one having a structure of a compact type digital camera which performs photometry by an image pickup device for photographing. Note that in the compact-type electronic camera, when photographing is performed in a state that a picture composition assisting frame for determining a photographing picture composition is displayed in a superimposed manner on the display screen of an electronic viewfinder, the position of a main subject may be determined based on the position of the picture composition assisting frame. Note that the analyzing processing circuit shown in the above-described embodiment can be mounted in a silver film camera as an exposure calculating device.

(2) When the RAW image data are generated in the above-described embodiment, information showing the gradation characteristic data selected in S110 may be recorded in the header file. Further, in the above-described embodiment, the digital development processing may be performed by executing an image processing program on a personal computer.

The invention is not limited to the above embodiments and various modifications may be made without departing from the spirit and scope of the invention. Any improvement may be made in part or all of the components.

What is claimed is:

1. A camera, comprising:
a photometry section which obtains photometry values at a plurality of positions of a subject;
an exposure calculating section which obtains an exposure value when photographing based on said photometry values; and
a correction calculating section which obtains a correction value for correction of said exposure value based on a difference between a highest value among photometry values belonging to a predetermined range out of said plurality of photometry values obtained by said photometry section and said exposure value obtained in said exposure calculating section.

2. The camera according to claim 1, wherein
said highest value is a highest value among photometry values equal to or smaller than a predetermined value out of said plurality of photometry values.

3. The camera according to claim 1, wherein
said correction value is a value for correction of said exposure value to an under side.

4. The camera according to claim 1, wherein
said correction calculating section obtains a correction value for correction of said exposure value to a more under side as said difference is larger.

5. The camera according to claim 1, wherein
said exposure calculating section detects a facial part of a person as said subject, and obtains said exposure value based on a photometry value corresponding to said facial part out of said plurality of photometry values obtained in said photometry section.

6. A camera, comprising:
a photometry section which obtains photometry values at a plurality of positions of a subject;
an exposure calculating section which obtains an exposure value when photographing based on said photometry values;
a correction calculating section which obtains a correction value for correction of said exposure value based on a difference between a second highest photometry value excluding a highest value out of said plurality of photometry values obtained by said photometry section and said exposure value obtained in said exposure calculating section;
an imaging section which images an image of said subject; and
a control section which controls an exposure when photographing in said imaging section based on said correction value and said exposure value.

7. The camera according to claim 6, further comprising an image processing section which performs gradation conversion processing on an output from said imaging section.

8. The camera according to claim 7, wherein
said image processing section changes a gradation characteristic in said gradation conversion processing based on a difference between said exposure value obtained in said exposure calculating section and said highest value.

9. The camera according to claim 8, wherein
said image processing section uses a gradation characteristic in which an output gradation value changes more largely as said difference is larger in an area having a small gradation value.

10. The camera according to claim 7, wherein
said correction calculating section obtains a correction value for correction of said exposure value to a more under side as said difference is larger.

11. A method of imaging, comprising the steps of:
obtaining photometry values at a plurality of positions of a subject;
obtaining an exposure value when photographing based on said photometry values;
obtaining a correction value for correction of said exposure value based on a difference between a highest value among photometry values belonging to a predetermined range out of said plurality of photometry values and said exposure value; and
controlling an exposure based on said correction value and imaging an image of said subject.

12. The method of imaging according to claim 11, wherein
said highest value is a highest value among photometry values equal to or smaller than a predetermined value out of said plurality of photometry values.

13. The method of imaging according to claim 11, wherein
said correction value is a value for correction of said exposure value to an under side.

14. The method of imaging according to claim 13, wherein
the correction value is a value that corrects the exposure value to a more under side as the difference between a highest value among photometry values belonging to a predetermined range obtained out of said plurality of photometry values and said exposure value becomes larger.

15. The method of imaging according to claim 11, wherein
in said step of obtaining said exposure value, a facial part of a person as said subject is detected, and said exposure value is obtained based on a photometry value corresponding to said facial part out of said plurality of photometry values.

16. The method of imaging according to claim 11, further comprising the step of performing gradation conversion processing on an image obtained in said step of imaging the image of said subject.

17. The method of imaging according to claim 16, wherein
in said step of performing said gradation conversion processing, a gradation characteristic in said gradation conversion processing is changed based on a difference between said exposure value and said highest value.

18. The method of imaging according to claim 17, wherein
in said step of performing said gradation conversion processing, a gradation characteristic in which an output gradation value changes more largely as said difference is larger in an area having a small gradation value is used.

19. The method of imaging according to claim 16, wherein
in said step of obtaining said correction value, a correction value for correction of said exposure value to a more under side as said difference is larger is obtained.

20. A method of imaging, comprising the steps of:
obtaining photometry values at a plurality of positions of a subject;
obtaining an exposure value when photographing based on said photometry values;
obtaining a correction value for correction of said exposure value based on a difference between said exposure value and a second highest photometry value excluding a highest value out of said plurality of photometry values; and
controlling an exposure based on said correction value and imaging an image of said subject.

21. The method of imaging according to claim 20, wherein
in said step of obtaining said correction value, a correction value for correction of said exposure value to a more under side as said difference is larger is obtained.

* * * * *